United States Patent
Zhou et al.

(10) Patent No.: US 10,848,671 B2
(45) Date of Patent: Nov. 24, 2020

(54) CAMERA ASSEMBLY AND TERMINAL

(71) Applicant: BEIJING XIAOMI MOBILE SOFTWARE CO., LTD., Beijing (CN)

(72) Inventors: Kai Zhou, Beijing (CN); Gaocai Han, Beijing (CN); Hongzhi Jin, Beijing (CN); Tao Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/664,818

(22) Filed: Oct. 26, 2019

(65) Prior Publication Data
US 2020/0244877 A1 Jul. 30, 2020

(30) Foreign Application Priority Data
Jan. 25, 2019 (CN) .......................... 2019 1 0074684

(51) Int. Cl.
*H04N 5/232* (2006.01)
*H04N 5/225* (2006.01)

(52) U.S. Cl.
CPC ....... *H04N 5/23238* (2013.01); *H04N 5/2253* (2013.01); *H04N 5/2258* (2013.01); *H04N 5/23299* (2018.08)

(58) Field of Classification Search
None
See application file for complete search history.

(56) References Cited

FOREIGN PATENT DOCUMENTS

| CN | 202172446 U | * | 3/2012 | |
|----|----|----|----|----|
| CN | 202172446 U | | 3/2012 | |
| CN | 101833231 B | * | 5/2012 | |
| CN | 101833231 B | | 5/2012 | |
| WO | 2018188609 A1 | | 10/2018 | |
| WO | WO-2018188609 A1 | * | 10/2018 | ............. H04N 5/232 |

OTHER PUBLICATIONS

Extended European Search Report (EESR) dated Mar. 17, 2020 in EP application 19205999.6.

* cited by examiner

*Primary Examiner* — William C Vaughn, Jr.
*Assistant Examiner* — Joseph Daniel A Towe
(74) *Attorney, Agent, or Firm* — Syncoda LLC; Feng Ma

(57) ABSTRACT

A camera assembly includes a base, and two cameras located on the base. When the base makes the two cameras in a tilted state, an angle between a first plane and a second plane is greater than 0 degree and less than 180 degrees, and back surfaces of the two cameras are opposing each other. The first plane is a plane perpendicular to an optical axis direction of one of the two cameras, and the second plane is a plane perpendicular to an optical axis direction of the other one of the two cameras.

16 Claims, 6 Drawing Sheets

CAMERA ASSEMBLY AND TERMINAL

CROSS-REFERENCE TO RELATED APPLICATION

This application claims priority to Chinese Patent Application Serial No. 201910074684.2 filed on Jan. 25, 2019, the disclosure of which is incorporated herein by reference in its entirety.

BACKGROUND

With the popularity of mobile terminals and the rapid development of electronics technologies, mobile phones are playing an increasingly important role in users' lives. A mobile phone is no longer just a tool for voice communications or surfing the Internet, but also essentially replaces a camera in daily life because of its increasingly powerful camera function. The mobile phone therefore has become a major tool carried around by user for image capturing and video recording.

SUMMARY

The present disclosure relates general to a field of electronic device technologies, and more specifically to a camera assembly and a terminal.

Embodiments of the present disclosure provide a camera assembly and a terminal.

According to a first aspect of embodiments of the present disclosure, there is provided a camera assembly, including: a base; and two cameras located on the base. When the base makes the two cameras in a tilted state, an angle between a first plane and a second plane is greater than 0 degree and less than 180 degrees, back surfaces of the two cameras lean towards each other, the first plane is a plane perpendicular to an optical axis direction of one of the cameras, and the second plane is a plane perpendicular to an optical axis direction of the other of the cameras.

According to a second aspect of embodiments of the present disclosure, there is provided another camera assembly, including: a base; a first camera located on the base, and having a first optical axis, a first photographing surface, and a first back surface opposite the first photographing surface; and a second camera located on the base, and having a second optical axis, a second photographing surface, and a second back surface opposite the second photographing surface. The first camera and the second camera have two states, in a first state, the first optical axis is parallel with the second optical axis; and in a second state, the first back surface and the second back surface lean towards each other.

According to a third aspect of embodiments of the present disclosure, there is provided a terminal, including: a camera assembly, including: a base; a first camera located on the base, and having a first optical axis and a first side surface, the first side surface having a first edge on the base and a second edge opposite the first edge; and a second camera located on the base, and having a second optical axis and a second side surface, the second side surface having a third edge on the base and a fourth edge opposite the third edge; in which the first camera and the second camera have two state, in a first state, the first optical axis is parallel with the second optical axis, and the first side surface is opposite the second side surface; and in a second state, the first optical axis and the second optical axis lean against each other, and the second edge is away from the fourth edge; and a processor configured to execute an instruction of synthesizing a plurality of pictures taken by the first camera and the second camera into one or more wide-angle pictures.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of various embodiments of the present disclosure.

DETAILED DESCRIPTION

Figure 1:
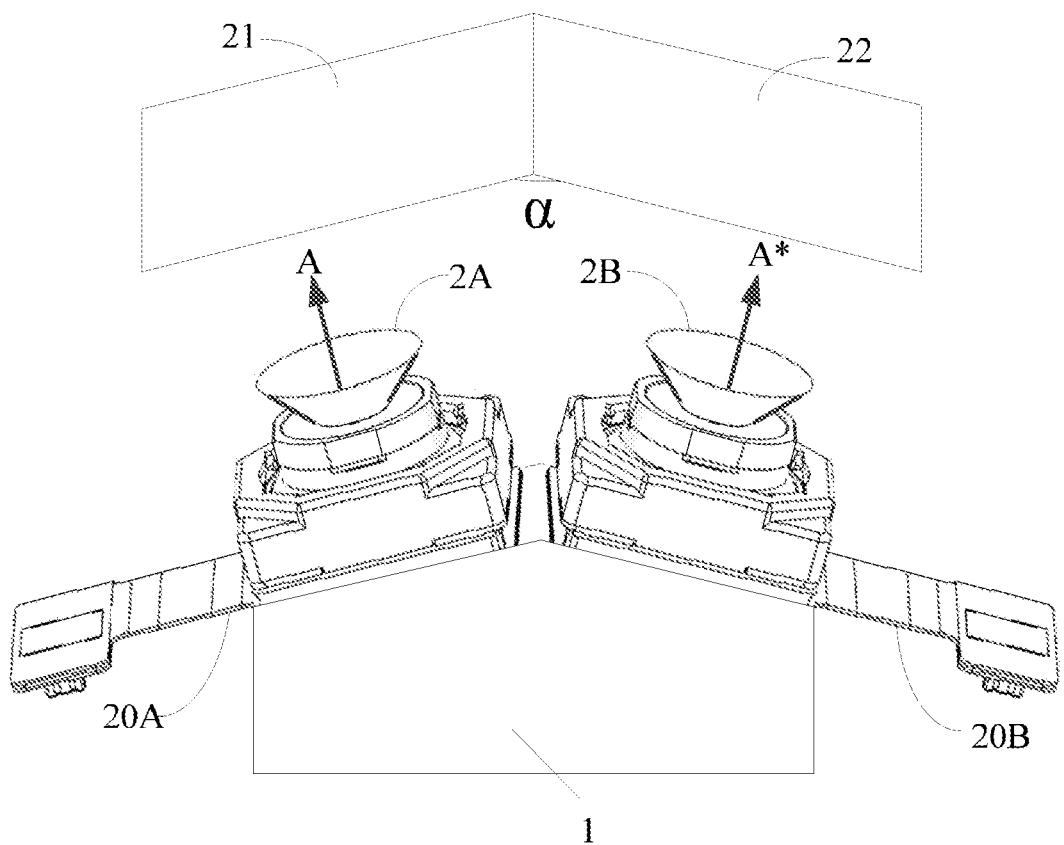
FIG. 1 is a schematic structural diagram of a camera assembly according to some embodiments.

Exemplary embodiments of the present disclosure will be described in detail and examples of the embodiments will be illustrated in the drawings. When the following description refers to the drawings, unless specified otherwise, the same numbers in different drawings represent the same or similar elements. The implementations described in the following exemplary embodiments do not represent all implementations consistent with the present disclosure, and instead they are merely examples of devices and methods consistent with aspects of the present disclosure as detailed in the appended claims.

In the present disclosure, in the absence of description to the contrary, orientation terms, such as "inner," "outer" or the like are generally in terms of a contour of the corresponding component. In addition, the terms such as "first" and "second" in embodiments of the present disclosure are used to distinguish one element from another element, and are not intended to indicate or imply any sequence or relative importance.

At present, a wide-angle camera of a terminal has a large viewing angle, and can take a comparatively wide picture and be used to capture large-scale photographs. However, due to a fixed area of a camera light sensing chip, there are more distortions in details of the picture compared with a small-view-angle camera.

In order to solve the above problems, various embodiments of the present disclosure provide a camera assembly, and the camera assembly includes a base and two cameras, and the two cameras are located on the base. When the base makes the two cameras in a tilted state, an angle between a first plane and a second plane is greater than 0 degree and less than 180 degrees, and back surfaces of the two cameras lean towards each other. The first plane is a plane perpendicular to an optical axis direction of one of the cameras and the second plane is a plane perpendicular to an optical axis direction of the other one of the cameras. The photographing range of the two cameras must be larger than that of a single camera and the two cameras are leant against each other, such that the photographing range of the camera assembly can be further expanded. Thus, the two cameras with a smaller photographing angle can be used to form the above-mentioned camera assembly, which can take a broader picture with comparatively good details and features.

Various embodiments of the present disclosure also provide a camera assembly, and the camera assembly includes a base; a first camera located on the base, and having a first optical axis, a first photographing surface, and a first back surface opposite the first photographing surface; and a second camera located on the base, and having a second optical axis, a second photographing surface, and a second back surface opposite the second photographing surface. The first camera and the second camera have two states, in a first state, the first optical axis is parallel with the second optical axis; and in a second state, the first back surface and the second back surface lean towards each other.

Various embodiments of the present disclosure further provide a terminal, including a camera assembly and a controller. The camera assembly includes a base; a first camera located on the base, and having a first optical axis and a first side surface, the first side surface having a first edge on the base and a second edge opposite the first edge; and a second camera located on the base, and having a second optical axis and a second side surface, the second side surface having a third edge on the base and a fourth edge opposite the third edge. The first camera and the second camera have two state, in a first state, the first optical axis is parallel with the second optical axis, and the first side surface is opposite the second side surface; and in a second state, the first optical axis and the second optical axis lean against each other, and the second edge is away from the fourth edge. The processor is configured to execute an instruction of synthesizing a plurality of pictures taken by the first camera and the second camera into one or more wide-angle pictures.

FIG. 1 is a schematic view of a camera assembly according to an exemplary embodiment. As illustrated in FIG. 1, the camera assembly includes a base 1 and two cameras, namely a camera 2A and a camera 2B.

As illustrated in FIG. 1, the camera 2A and the camera 2B are arranged on the base 1, and the base 1 makes the camera 2A and the camera 2B in a tilted state. As illustrated in FIG. 1. When the camera 2A and the camera 2B are leant, an angle α between a first plane 21 and a second plane 22 is greater than 0 degree and less than 180 degrees, and back surfaces of the two cameras (a back surface 20 A of the camera 2A and a back surface 20B of the camera 2B) are opposite each other, that means the back surface 20 A and the back surface 20B lean towards each other. It should be noted that, the first plane 21 is a plane perpendicular to an optical axis direction A of the cameras 2A, and the second plane 22 is a plane perpendicular to an optical axis direction A* of the camera 2B. The optical axis direction of a camera refers to a lens optical axis direction of the camera, and also represents a photographing direction of the camera.

Herein, when the two cameras are leant as illustrated in FIG. 1, the photographing range of the camera assembly further expands to both sides, such that a wide-angle camera is no long needed, and only two non-wide-angle cameras with a smaller photographing angle are needed. As long as the two non-wide-angle cameras are leant as illustrated in FIG. 1, the camera assembly can also have a wider viewing angle and take a comparatively wide picture. Meanwhile, the non-wide-angle camera can also take pictures having comparatively good details.

Herein, the angle α between the first plane 21 and the second plane 22 is greater than 0 degree and less than 180 degrees. A value of the angle reflects the tilting degree of the two cameras. A large angle indicates a small tilting degree of the two cameras. A small angle indicates a large tilting degree of the two cameras. The value of angle needs to ensure that a plurality of pictures taken by the cameras 2A and the camera 2B separately can be synthesized into one or a plurality of wide-angle pictures. During a specific production process, the angle can be determined by respective photographing angles and distances of the two cameras. In an embodiment, the angle may be greater than 90 degrees and less than 180 degrees.

It should be noted that the base 1 can fix the two cameras, namely the camera 2A and the camera 2B in the tilted state as illustrated in FIG. 1. Of course, the base may also rotate the two cameras to the tilted state when a large view picture needs to be taken.

Figure 2:
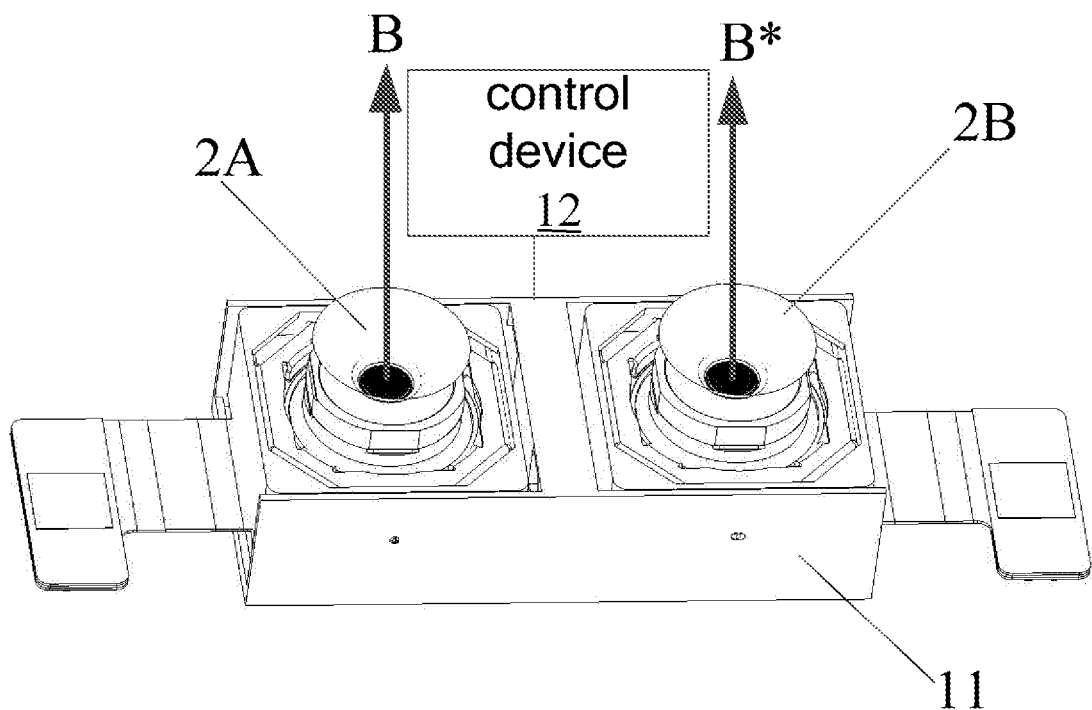
FIG. 2 is another schematic structural diagram of a camera assembly according to some embodiments.

In some implementations, FIG. 2 is a schematic view of a camera assembly according to an exemplary embodiment. As illustrated in FIG. 2, the above base 1 includes a rotation structure 11 and a control structure 12.

As illustrated in FIG. 2, the rotation structure 11 is fixedly connected to the two cameras (the camera 2A and the camera 2B) for driving each of the cameras to rotate from a parallel state to the tilted state or from the tilted state to the parallel state when rotating. The control structure 12 is connected with the rotation structure 11 for controlling the rotation of the rotation structure 11. When the two cameras (the camera 2A and the camera 2B) are in the parallel state as illustrated in FIG. 2, the optical axis directions of the two cameras, namely the optical axis direction of camera 2A and the optical axis direction of camera 2B, are parallel, and side surfaces of the two cameras are opposite. It should be noted herein that a photographing surface of a camera lens is a front surface of the camera, and a surface that is opposite the front surface of the camera is the back surface of the camera, and a side surface located between the front surface and the back surface of the camera is the side surface of the camera. When the two cameras are in parallel state, the surfaces of the two cameras opposite each other are side surfaces of the two cameras.

Herein, when a large view picture needs to be taken, the control structure 12 can control the rotation structure 11 to rotate the camera 2A and the camera 2B from the parallel state illustrated in FIG. 2 to the tilted state illustrated in FIG. 1. When a large view picture doesn't need to be taken, the control structure controls the rotation structure to rotate the two cameras from the tilted state illustrated in FIG. 1 to the parallel state illustrated in FIG. 2.

As illustrated in FIGS. 1 and 2, the photographing range of the camera assembly with the camera 2A and the camera 2B in the tilted state illustrated in FIG. 1 is larger than that of the camera assembly with the camera 2A and the camera 2B in the parallel state illustrated in FIG. 2.

The base can include the control structure and the rotation structure, such that the two cameras can be rotated in reverse directions to make the two cameras in the tilted state when needed, and thus, the viewing angle of the camera assembly is expanded to take a wide picture. When not needed, the two cameras can also be restored to the normal parallel state in order to reset the camera and take a normal picture.

Figure 3:
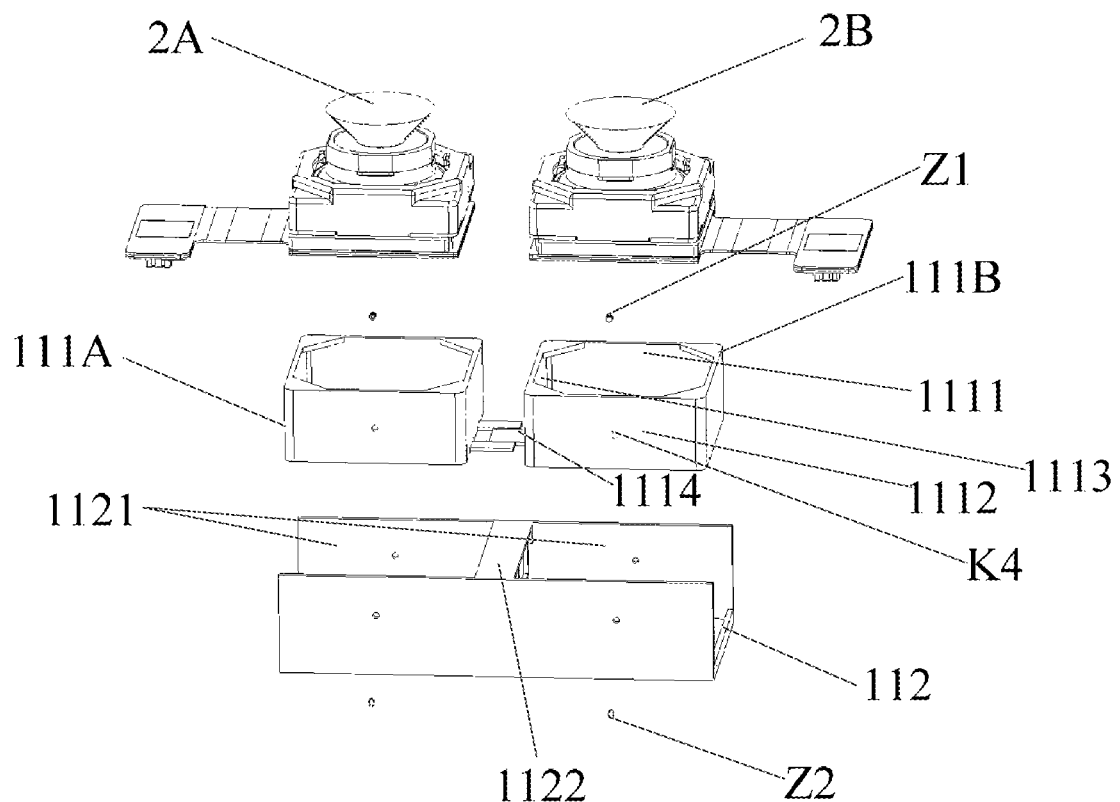
FIG. 3 is a structural exploded view of a camera assembly, according to some embodiments.

In some implementations, FIG. 3 is an exploded view of a camera assembly according to an exemplary embodiment. As illustrated in FIG. 3, the rotation structure 11 includes two rotation brackets, namely a rotation bracket 111A and a rotation bracket 111B, and a support bracket 112.

Herein, each of the two rotation brackets is fixedly connected to one corresponding camera. As illustrated in FIG. 3, the rotation bracket 111A may be fixedly connected to the camera 2A, and the rotation bracket 111B may be fixedly connected to the camera 2B. The rotation brackets drive the fixed cameras to rotate when rotate. The support bracket 112 is rotatably connected with the two rotation brackets to restrict rotating directions of the two rotation brackets. When the control structure 12 controls the two rotation brackets to rotate, each of the two rotation brackets only rotates backwards and forwards in one direction, but cannot freely rotates in other directions. As such, the rotation brackets only drive the fixedly connected cameras to rotate from the parallel state to the tilted state, or to drive the corresponding cameras to rotate from the tilted state to the parallel state.

A rotation device can be provided with two rotation brackets and one support bracket, each of the two rotation brackets is fixedly connected to one corresponding camera. The support bracket is rotatably connected to the two rotation brackets to restrict the rotating directions of the two rotation brackets.

As such, when the control structure controls rotation of the two rotation brackets, the rotation brackets are restricted to drive the corresponding cameras to rotate from the parallel state to the tilted state, or drive the corresponding cameras to rotate from the tilted state to the parallel state in a simple way.

In some implementations, as illustrated in FIG. 3, the support bracket 112 includes two receiving chambers 1121, and a partition plate 1122 is arranged between the two receiving chambers, and one rotation bracket is placed correspondingly in the receiving chamber 1121.

Figure 4:
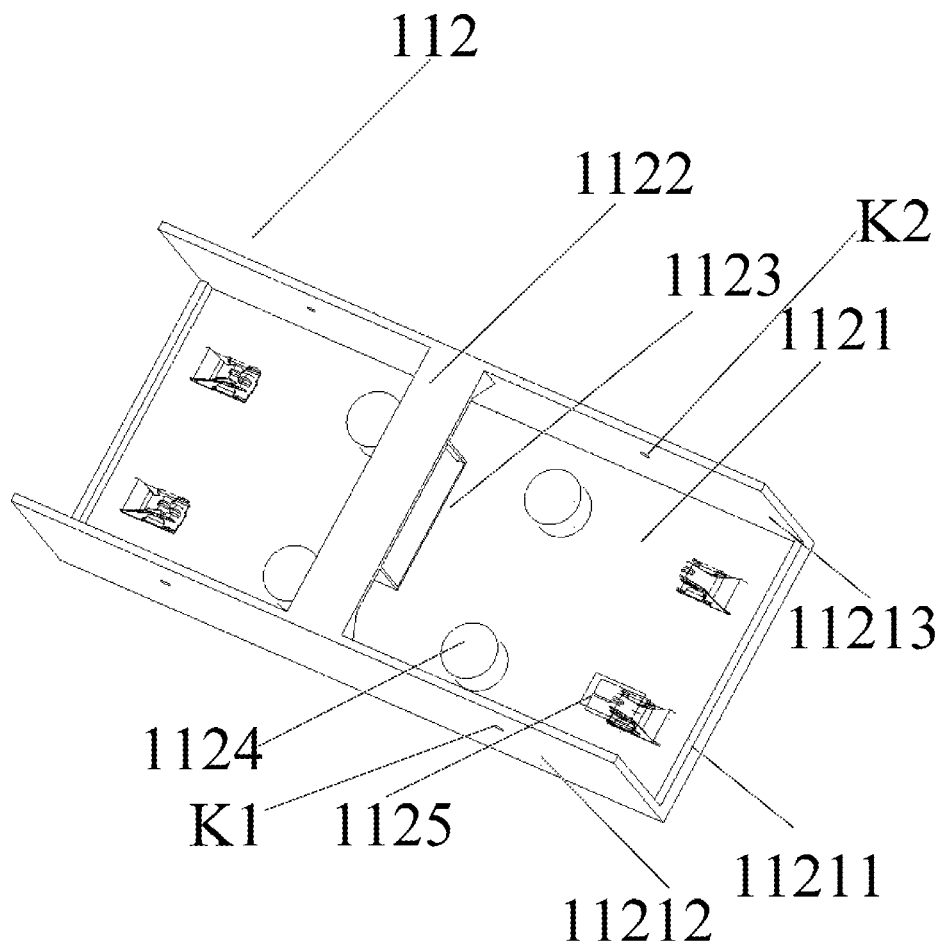
FIG. 4 is a schematic structural view of a support bracket according to some embodiments.

FIG. 4 is a schematic view of a support bracket according to an exemplary embodiment. As illustrated in FIG. 4, the partition plate 1121 defines a through slot 1123. The receiving chamber 1121 includes a first baseplate 11211, and a first vertical plate 11212 and a second vertical plate 11213 which are opposite each other.

The first baseplate 11211 is provided with at least one stop block 1124 and at least one resilient tab 1125. A distance between the stop block 1124 and the partition plate 1122 is less than a distance between the resilient tab 1125 and the partition plate 1122. That is, the stop block 1124 is adjacent to the partition plate 1222, and the resilient tab 1125 is away from the partition plate 1222. For example, as illustrated in FIG. 4, each first baseplate 11211 is provided with two stop blocks 1124 and two resilient tabs 1125, and the two stop blocks 1124 are symmetrically arranged about an axis on the first baseplate 11211, and the two resilient tabs 1125 are also symmetrically arranged about an axis on the first baseplate 11211.

The first vertical plate 11212 defines a first through hole K1, and the second vertical plate 11213 correspondingly defines a second through hole K2.

The two rotation brackets (the rotation bracket 111A and the rotation bracket 111B) are illustrated in FIG. 3, taking the rotation bracket 111B which is marked as an example, the rotation bracket 111B includes a first side plate 1111 and a second side plate 1112 opposite each other, and a third side plate connecting with side edges of the first side plate 1111 and the second side plate 1112. Third side plates of the two rotation brackets are opposite each other, and a bottom of the third side plate 1113 extends outwards to form a moving plate 1114, and part of the moving plate 1114 is located in the through slot 1123. The first side plate 1111 defines a third through hole K3 (not illustrated in the drawings), and a first shaft Z1 is arranged in the third through hole K3. The second side plate 1112 defines a fourth through hole K4, and a second shaft Z2 is arranged in the fourth through hole K4. The first shaft Z1 passes through the first through hole K1, in this way, the first shaft Z1 rotatably connects the first side plate 1111 with the first vertical plate 11212. The second shaft Z2 passes through the second through hole K2, and thus the second shaft Z2 rotatably connects the second side plate 1112 with the second vertical plate 11213. The first shaft Z1 and the second shaft Z2 rotatably connect the rotating bracket 111 with the receiving chamber 1121. It should be noted that the rotation bracket 111A has the same structure as the rotation bracket 111B at corresponding positions, which will not be repeated here.

Figure 5:
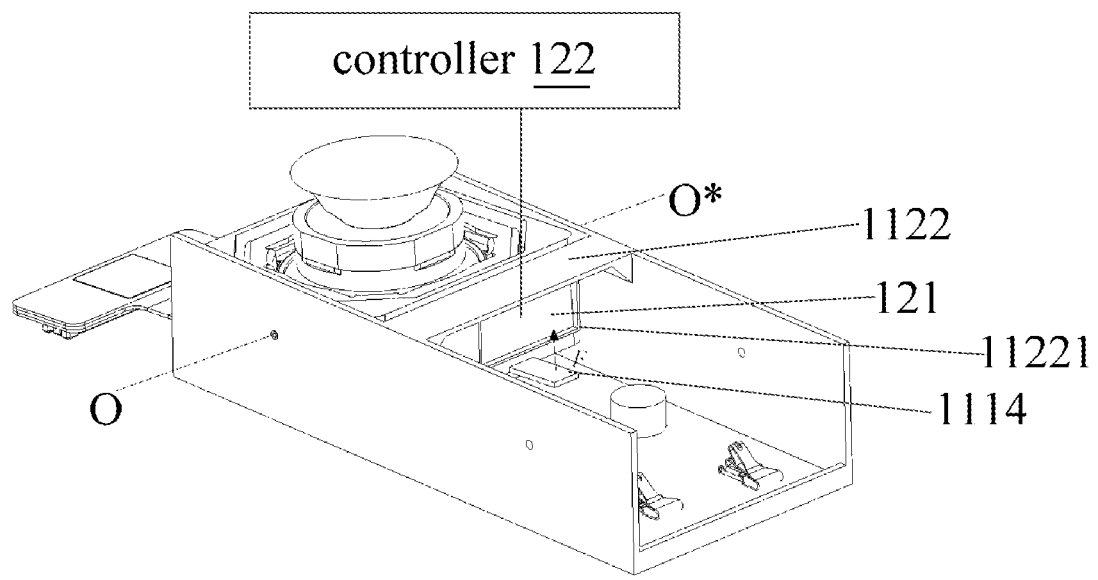
FIG. 5 is a structural diagram of a single camera in a camera assembly in a tilted state according to some embodiments.

Herein, the rotation bracket 111B and the support bracket 112 are rotatably connected by the first shaft at one side and are rotatably connected by the second shaft at the other opposite side, thereby achieving double-apex positioning between the rotation bracket 111B and the support bracket 112. The rotation bracket 111B only rotates about an axis defined by the first shaft and the second shaft. The first shaft is opposite the second shaft and there is no contact between them. For example, FIG. 5 is a view of a structure of a camera assembly according to an exemplary embodiment, in which a single camera rotates to a tilted state. As illustrated in FIG. 5, the rotation bracket drives the camera to rotate about an O-O* axis.

Herein, after being connected to the support bracket 112 by the two shafts, the rotation bracket only rotates about the axis defined by the two shafts, but the stop block 1124 and the through slot 1123 on the support bracket 112 restrict the rotation bracket to rotate within a small-angle range. When the control structure 12 exerts a pulling force on the moving plate 1114 in the through slot 1123 to make the moving plate move away from the first baseplate 11211, the rotation bracket is driven to rotate, the resilient tab 1125 is pressed downwards and deformed. The moving plate is stopped by the through slot 1123 after rotating to a certain angle and stops moving. At this time, the camera fixedly connected with the rotation bracket rotates from the parallel state to the tilted state, releasing the pulling force exerted on the moving plate 1114 in the through slot 1123. The rotation bracket rotates back under an elastic force of the resilient tab 1125 until the rotation bracket is stopped by the stop block 1124, and then the camera fixedly connected with the rotation bracket rotates from the tilted state to the parallel state.

The support bracket and the rotation brackets according to various embodiments of the disclosure may be configured as above, and the structure is simple and easy to realize.

In some implementations, as illustrated in FIG. 5, the control structure includes: an electromagnet 121 arranged on the partition plate 1122 (in which the electromagnet 121 may be fixed on the partition plate 1122), and a controller 122 configured to energize or de-energize the electromagnet 121. The moving plate is located between the electromagnet 121 and the first baseplate 11211, and the moving plate 1114 is made from ferromagnetic material.

Herein, after the controller 122 energizes the electromagnet 121, the electromagnet 121 generates a magnetic field which exerts an electromagnetic attraction F on the moving plate 1114 towards the electromagnet 121, and the electromagnetic attraction F makes the moving plate 1114 to lean outwards and towards the electromagnet 121, which drives the rotation bracket to rotate outward. The rotation bracket rotates outwards with the camera. At this time, the resilient tab 1125 on the first baseplate 1211 is pressed, and when the resilient tab 1125 is deformed to a certain position, the through slot 1123 prevents the moving plate 1114 from further tilting and rotating. At this time, the two cameras are in the tilted state to take a wide picture. When the cameras need to be reset to the parallel state, the controller 122 can de-energize the electromagnet 121, which releases the electromagnetic attraction exerted on the moving plate 1114 in the through slot 1123, and the resilient tab under the rotation bracket exerts a pulling force away from the first baseplate 11211 by a restoring force generated by its own deformation, and the pulling force makes the rotation bracket rotate back with the camera. When the rotation brackets rotate such that the two cameras are in the parallel state, the stop blocks 1124 prevent the rotation brackets from keep rotating, thereby maintaining the two cameras in the parallel state.

In the embodiment, the controller energizes or de-energizes the electromagnet to control the rotation of the rotation brackets, and the structure is simple and easy to realize.

In some implementations, as illustrated in FIG. 4, the partition plate 1122 defines a receiving groove 11221, and the electromagnet 121 is fixed in the receiving groove 11221.

In some embodiments, the electromagnet may be fixed in the receiving groove of the partition plate to ensure the structural stability of the camera assembly.

In some implementations, hole walls defining the first through hole K1, the second through hole K2, the third through hole K3 and the fourth through hole K4 are provided with internal threads. The first through hole K1 matches the third through hole K3, positions of them correspond to each other to enable the first shaft Z1 to pass through the first through hole K1 and the third through hole K3. The second through hole K2 matches the fourth through hole K4, positions of them correspond to each other to enable the second shaft Z2 to pass through the second through hole K2 and the fourth through hole K4.

The first shaft Z1 and the second shaft Z2 are screws matching the internal threads. The first shaft Z1 and the second shaft Z2 are therefore threadedly connected with the rotation bracket and the support bracket. Each of the screw includes a screw head and a screw rod. The screw rod is provided with a screw cap fixed to an end opposite the screw head of the screw rod, such that the screw can be prevented from failing from the through hole.

The first shaft and the second shaft rotate in a screw manner, which prevent the first shaft and the second shaft rotating freely, and the screw cap fixed on the screw prevents the screw from failing so as to ensure the structural stability of the camera assembly.

In some implementations, a bonding layer is arranged between the camera and the corresponding rotation bracket.

In some embodiments, the camera is adhered and fixed to the rotation bracket by the bonding layer and the fixation is simple and easy to realize.

In some implementations, as illustrated in FIG. 3, in the two rotation brackets, the bottom of the third side plate 1113 of one rotation bracket 111B extends and forms a first mobile plate, and the bottom of the third side plate 1113 of the other rotation bracket 111A extends and forms two identical second mobile plates. The two identical second mobile plates are arranged on both sides of the first mobile plate, and distances from the two identical second mobile plates to the first mobile plate are the same.

Therefore, the pulling forces exerted on the moving plates of both rotating brackets by the control structure 12 symmetrically affect the rotation brackets, thereby facilitating the stable rotation of the rotating brackets.

Figure 6:
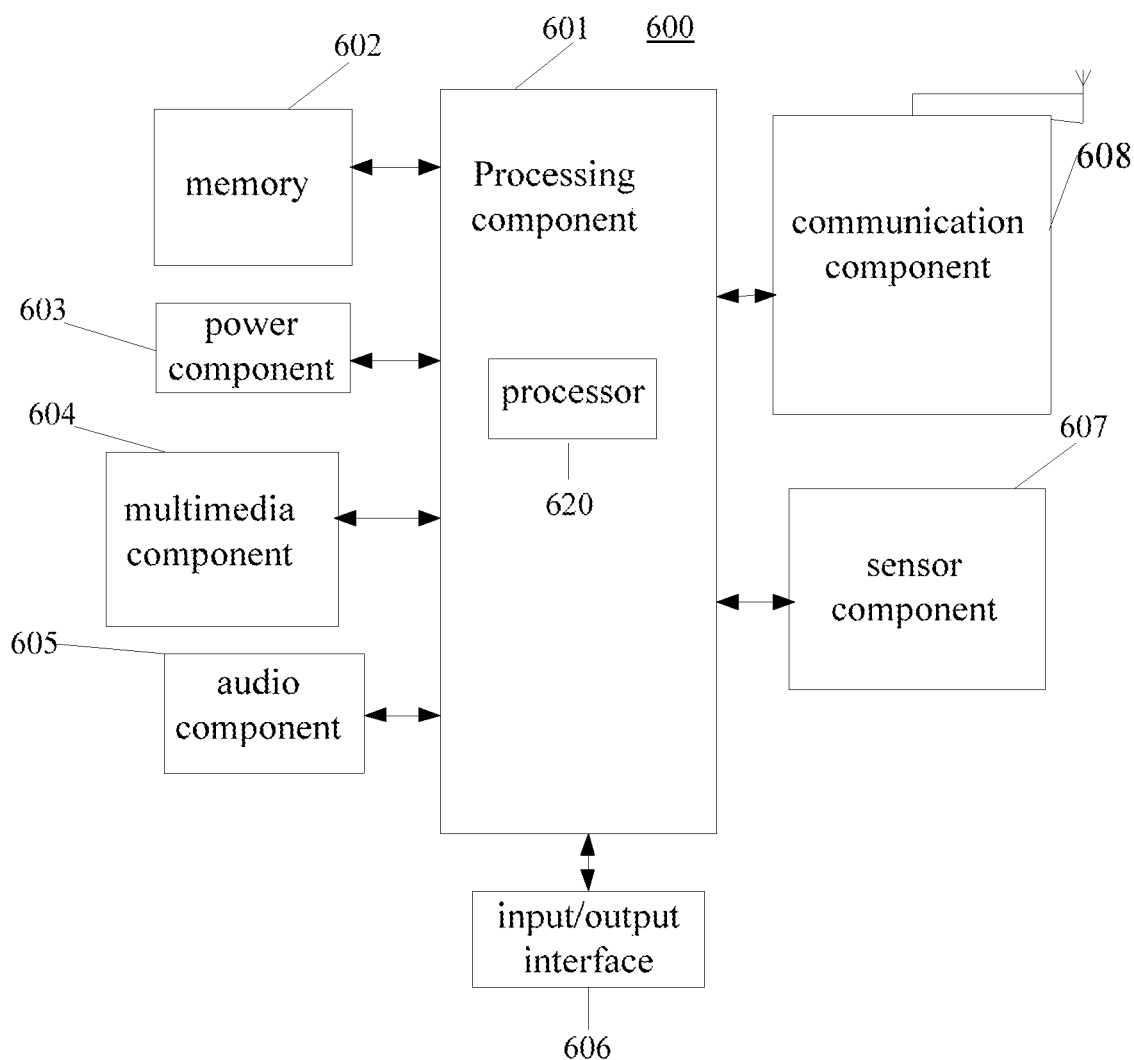
FIG. 6 is a block diagram of a terminal according to some embodiments.

Various embodiments of the present disclosure also provide a terminal including the above various camera assemblies. FIG. 6 is a block diagram of a terminal according to an exemplary embodiment. For example, a terminal 600 may be a mobile phone, a game console, a computer, a tablet device, a personal digital assistant, etc.

The terminal 600 may include one or more of the following components: a processing component 601, a memory 602, a power component 603, a multimedia component 604, an audio component 605, an input/output (I/O) interface 606, a sensor component 607, and a communication component 608.

The processing component 601 usually controls the overall operation of terminal 600, such as operations associated with display, telephone call, data communication, camera operation and recording operation. The processing component 601 may include one or more processors 620 to execute instructions, such as an instruction of synthesizing a plurality of pictures taken by the two cameras into one or more wide-angle pictures to achieve wide-angle effect. In addition, the processing component 601 may include one or more modules to facilitate interaction between the processing component 601 and other components. For example, the processing component 601 may include a multimedia module to facilitate interaction between the multimedia component 604 and the processing component 601, and the processing component 601 may also include the above controller 122 to control the rotation of the two cameras in the camera assembly.

The memory 602 is configured to store various types of data to support operation at the terminal 600. Examples of these data include instructions for any application or method that operates on the terminal 600, such as contact data, phone book data, messages, pictures, videos, etc. The memory 602 may be achieved by any type of volatile or non-volatile storage devices or their combination, such as a static random access memory (SRAM), an electrically erasable programmable read only memory (EEPROM), an erasable programmable read-only memory (EPROM), a programmable read-only memory (PROM), a read-only memory (ROM), a magnetic memory, a flash memory, a magnetic or optical disc.

The power component 603 provides power for various components of the terminal 600. The power component 603 may include a power management system, one or more power sources, and other components associated with generating, managing and distributing power for the terminal 600.

The multimedia component 604 includes a screen providing an output interface between the terminal 600 and a user. In some embodiments, the screen may include a liquid crystal display (LCD) and a touch panel (TP). In some embodiments, the screen can include an OLED (organic light emitting diode) display, or other types of displays.

If the screen includes the touch panel, the screen may be implemented as a touch screen to receive input signals from the user. The touch panel includes one or more touch sensors to sense touch, sliding and gestures on the touch panel. The touch sensor may not only sense the boundary of the touch or sliding operation, but also detect the duration and pressure associated with the touch or sliding operation.

In some embodiments, the multimedia component 604 can include a front camera, and the camera assembly comprising the two rear cameras. When the terminal 600 is in an operational mode, such as an image capturing mode or a video recording mode, the front camera and/or rear cameras may receive external multimedia data. Each of the front camera and the rear cameras may be a fixed optical lens system with focal length and optical zoom capability.

The audio component 605 is configured to output and/or input audio signals. For example, the audio component 605 includes a microphone (MIC). When the terminal 600 is in an operational mode, such as a calling mode, a recording mode and a speech recognition mode, the microphone is configured to receive external audio signals. The received audio signal may be further stored in the memory 602 or transmitted via the communication component 608. In some embodiments, the audio component 605 also includes a speaker for outputting audio signals.

The I/O interface 606 is configured to provide interface between the processing component 601 and a peripheral interface module, the above peripheral interface module may be a keyboard, a click wheel, a button, etc. The button may include, but is not limited to, a home page button, a volume button, a start button and a lock button.

The various device components, units, blocks, or portions may have modular configurations, or are composed of discrete components, but nonetheless can be referred to as "modules" in general. In other words, the "components," "portions," "modules" or "units" referred to herein may or may not be in modular forms.

The sensor component 607 includes one or more sensors to provide status assessments of various aspects of the terminal 600. For example, the sensor component 607 may detect the on/off state of the terminal 600, relative positioning of components, such as a display and a keypad of terminal 600. The sensor component 607 may also detect the position change of the terminal 600 or a component of the terminal 600, and presence or absence of user contact with the terminal 600, the orientation or acceleration/deceleration of terminal 600 and the temperature change of terminal 600. The sensor component 607 may include a proximity sensor configured to detect the presence of a nearby object without any physical contact. The sensor module 607 may also include an optical sensor, such as a CMOS or CCD image sensor, so as to use in imaging applications. In some embodiments, the sensor component 607 may also include an acceleration sensor, a gyroscope sensor, a magnetic sensor, a pressure sensor or a temperature sensor.

The communication component 608 is configured to facilitate wired or wireless communication between the terminal 600 and other devices. The terminal 600 may access wireless networks based on communication standards, such as Wi-Fi, 2G, 3G, 4G, or 5G, or their combinations. In an exemplary embodiment, the communication component 608 receives broadcast signals or broadcast related information from an external broadcast management system via a broadcast channel. In an exemplary embodiment, the communication component 608 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an exemplary embodiment, the terminal 600 may be implemented by one or more application specific integrated circuits (ASIC), digital signal processors (DSPs), digital signal processing devices (DSPDs), programmable logic devices (PLDs), field programmable gate arrays (FPGAs), controllers, microcontrollers, microprocessors or other electronic components by performing the above methods.

In the exemplary embodiment, a non-transitory computer-readable storage medium including instructions is provided, such as the memory 602 including instructions, and the above instructions may be executed by the processor 620 of the terminal 600 so as to accomplish the above method. For example, the non-transitory computer-readable storage medium may be the ROM, a random-access memory (RAM), a CD-ROM, a tape, a floppy disk, an optical data storage device, etc.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized. Some other embodiments of the present disclosure can be available to those skilled in the art upon consideration of the specification and practice of the various embodiments disclosed herein.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A camera assembly, comprising:
   a base; and
   two cameras located on the base,
   wherein upon the two cameras being in a tilted state as confined by the base, an angle between a first plane and a second plane is greater than 0 degree and less than 180 degrees, back surfaces of the two cameras lean towards each other, the first plane is a plane perpendicular to an optical axis direction of one of the cameras, and the second plane is a plane perpendicular to an optical axis direction of the other of the cameras,
   wherein the base comprises:
   a rotation device fixedly connected to the two cameras, wherein the rotation device is used to drive the two cameras to rotate from a parallel state to the tilted state or from the tilted state to the parallel state when rotates; and
   a control device connected to the rotation device to control rotation of the rotation device,
   wherein when the two cameras are in the parallel state, optical axis directions of the two cameras are parallel and side surfaces of the two cameras are opposite,
   wherein the rotation device comprises:
   two rotation brackets, each of the two rotation brackets being fixedly connected to one of the two cameras; and
   a support bracket rotatably connected with the two rotation brackets to restrict rotating direction of the two rotation brackets, wherein when the control device controls rotation of the two rotation brackets, the support bracket restricts the control device to drive the two cameras to rotate from the parallel state to the tilted state, or to drive the two cameras to rotate from the tilted state to the parallel state.

2. The camera assembly according to claim 1, wherein, the support bracket has two receiving chambers, a partition plate is arranged between the two receiving chambers, the partition plate defines a through slot, and each of the two rotation brackets is placed in one of the two receiving chambers;

each of the two receiving chambers is defined by a baseplate, a first vertical plate, and a second vertical plate, the first vertical plate is opposite the second vertical plate, wherein the baseplate is provided with at least one stop block and at least one resilient tab, a distance between the stop block and the partition plate is less than a distance between the resilient tab and the partition plate, and the first vertical plate defines a first through hole, and the second vertical plate defines a second through hole opposite the first through hole;

each of the two rotation brackets comprises a first side plate and a second side plate opposite each other, and a third side plate connected to a side edge of the first side plate and a side edge of the second side plate, third side plates of the two rotation brackets are opposite each other, a moving plate extends from a bottom of the third side plate, and part of the moving plate is located in the through slot; and the first side plate defines a third through hole, a first shaft is arranged in the third through hole, the second side plate defines a fourth through hole, and a second shaft is arranged in the fourth through hole; and the first shaft passes through the first through hole, and the second shaft passes through the second through hole, such that each of the two rotation brackets is rotatably connect to the one of the two receiving chambers; and the control device is configured to exerts a pulling force on the moving plate in the through slot to make the moving plate move away from the first baseplate.

3. The camera assembly according to claim 2, wherein the control device comprises:

an electromagnet arranged on the partition plate; and
a controller configured to energize or de-energize the electromagnet,
wherein the moving plate is located between the electromagnet and the first baseplate, and the moving plate is made from ferromagnetic material.

4. The camera assembly according to claim 3, wherein the partition plate defines a receiving groove, and the electromagnet is arranged in the receiving groove.

5. The camera assembly according to claim 2, wherein walls defining the first through hole, the second through hole, the third through hole and the fourth through hole are provided with internal threads, the first through hole matches the third through hole, and the second through hole matches the fourth through hole; and the first shaft and the second shaft are screws matching the internal threads, each of the screws comprises a screw head and a screw rod, and a screw cap is fixed at an end, opposite the screw head, of the screw rod.

6. The camera assembly according to claim 2, wherein each of the two cameras is fixed to one of the two rotation brackets by means a bonding layer.

7. The camera assembly according to claim 2, wherein the moving plate of one of the two rotation brackets comprises one first mobile plate, and the moving plate of the other one of the two rotation brackets comprises two identical second mobile plates, the two identical second mobile plates are arranged on two sides of the first mobile plate, and distances from the two identical second mobile plates to the first mobile plate are the same.

8. A camera assembly, comprising:
a base;
a first camera located on the base, and having a first optical axis, a first photographing surface, and a first back surface opposite the first photographing surface; and a second camera located on the base, and having a second optical axis, a second photographing surface, and a second back surface opposite the second photographing surface, wherein the first camera and the second camera have two states, in a first state, the first optical axis is parallel with the second optical axis; and in a second state, the first back surface and the second back surface lean towards each other, wherein the base comprises:
a rotation device fixedly connected to the first camera and the second camera and driving the first camera and the second camera to rotate between the first state and the second state; and
a control device connected to the rotation device to control rotation of the rotation device,
wherein the rotation device comprises:
two rotation brackets, each of the two rotation brackets being fixedly connected to one of the first camera and the second camera; and
a support bracket rotatably connected with the two rotation brackets to restrict rotating direction of the two rotation brackets.

9. The camera assembly according to claim 8, wherein each of the two rotation brackets is fixedly connected to one of the first camera and the second camera by means a bonding layer.

10. The camera assembly according to claim 8, wherein the support bracket has a bottom wall, a partition plate, a first side wall, and a second side wall, the first side wall and the second side wall are opposite and connected to the bottom wall, and the partition plate has a through slot and is arranged among the bottom wall, the first side wall, and the second side wall to separate the two rotation brackets, each of the two rotation brackets is rotatably connected to the first side wall and the second side wall by means of a shaft.

11. The camera assembly according to claim 10, wherein each of the two rotation brackets comprises a first side plate and a second side plate opposite each other, a first side plate is rotatably connected to the first side wall by means of a first shaft, and the second side plate is rotatably connected to the second side wall by means of a second shaft.

12. The camera assembly according to claim 10, wherein the control device comprises an electromagnet arranged on the partition plate, and a controller configured to energize or de-energize the electromagnet, each of the two rotation brackets has a moving plate extending through partition plate through the through slot, the moving plate is located between the electromagnet and the bottom wall, and the moving plate is made from ferromagnetic material.

13. The camera assembly according to claim 11, wherein the moving plate of one of the two rotation brackets comprises one first mobile plate, and the moving plate of the other one of the two rotation brackets comprises two identical second mobile plates, and the first mobile plate is located between the two identical second mobile plates.

14. The camera assembly according to claim 11, wherein each of the two rotation brackets further comprises a third side plate, the moving plate extends from the third side plate, and third side plates of the two rotation brackets face each other.

15. The camera assembly according to claim 10, wherein the bottom wall is provided with at least one stop block and at least one resilient tab at one side of the partition plate, a distance between the stop block and the partition plate is less than a distance between the resilient tab and the partition plate.

16. A terminal, comprising:
a camera assembly, comprising:
a base;
a first camera located on the base, and having a first optical axis and a first side surface, the first side surface having a first edge on the base and a second edge opposite the first edge; and
a second camera located on the base, and having a second optical axis and a second side surface, the second side surface having a third edge on the base and a fourth edge opposite the third edge;
wherein the first camera and the second camera have two state, in a first state, the first optical axis is parallel with the second optical axis, and the first side surface is opposite the second side surface; and in a second state, the first optical axis and the second optical axis lean against each other, and the second edge is away from the fourth edge; and
a processor configured to execute an instruction of synthesizing a plurality of pictures taken by the first camera and the second camera into one or more wide-angle pictures,
wherein the base comprises:
a rotation device fixedly connected to the first camera and the second camera and driving the first camera and the second camera to rotate between the first state and the second state; and
a control device connected to the rotation device to control rotation of the rotation device,
wherein the rotation device comprises:
two rotation brackets, each of the two rotation brackets being fixedly connected to one of the first camera and the second camera; and
a support bracket rotatably connected with the two rotation brackets to restrict rotating direction of the two rotation brackets.

\* \* \* \* \*